United States Patent Office 3,330,849
Patented July 11, 1967

3,330,849
STABILIZATION OF ORGANIC ISOCYANATES
Henri Ulrich, Northford, Conn., assignor to The Upjohn Company, Kalamazoo, Mich., a corporation of Delaware
No Drawing. Filed May 5, 1964, Ser. No. 365,186
11 Claims. (Cl. 260—453)

ABSTRACT OF THE DISCLOSURE

Organic isocyanates are stabilized against decomposition causing discoloration and precipitate formation by addition of a small amount of an organic sulfonyl isocyanate.

---

This invention relates to novel compositions of matter and to methods of stabilizing organic compounds. In particular, this invention relates to organic isocyanates stabilized against discoloration and to methods of retarding the discoloration of organic isocyanates. This invention also relates to organic isocyanates stabilized against precipitate formation and to methods of retarding precipitate formation in organic isocyanates.

Organic isocyanates including both monoisocyanates and polyisocyanates are generally colorless liquids or solids which tend to decompose on storage even in the absence of air and moisture. In some instances, this decomposition results in discoloration of the organic isocyanate, i.e., a change to a light yellow to brown or even, in extreme cases, to dark brown. In other instances, the decomposition results in the formation of products with relatively high melting points and low solubility in the organic isocyanate. If the organic isocyanate is a liquid at the storage temperature, these decomposition products will accumulate in the form of a precipitate. If the organic isocyanate is a solid at the storage temperature, the solid decomposition products are still likely to form but, of course, will not be revealed as a precipitate until the organic isocyanate is melted as it often is prior to transfer from the storage container. In some instances, both discoloration and precipitate formation are observed. In other instances, only one or the other of these decomposition phenomena is observed.

The discoloration of organic isocyanates represents a serious problem where colorless or light colored reaction products are to be produced. Precipitate formation in organic isocyanates also represents a serious problem when the isocyanates are to be metered through small-bore pipes and valves, or where solid impurities are undesirable in a reaction product, for example, an elastomeric fiber or film. Although discolorations can be removed by distillation and undesired solids can be removed by filtration or distillation, the thus treated organic isocyanates often discolor again and/or deposit precipitates within a few days or, in some instances, even in a few hours. It is not economical and is usually impractical to distill or filter an organic isocyanate immediately before use. Hence, any method of preventing or retarding discoloration and/or precipitate formation in organic isocyanates would be of great value to the users of these useful substances.

The exact causes of color formation and precipitate formation in organic isocyanates are not known. Although it has been observed that light, oxygen, and moisture tend to accelerate these phenomena, an organic isocyanate will often darken and/or deposit precipitate even when kept in the dark in a sealed container with oxygen and moisture excluded. It is thought that the precipitates which form in organic isocyanates are, at least in part, polymerized isocyanates.

The present invention relates to organic isocyanates stabilized against discoloration by having incorporated therewith a stabilizing amount of an organic sulfonyl isocyanate. The present invention also relates to organic isocyanates stabilized against precipitate formation by having incorporated therewith a stabilizing amount of an organic sulfonyl isocyanate. Still another aspect of this invention relates to methods of retarding the discoloration of isocyanates and of retarding precipitate formation in organic isocyanates by incorporating with the organic isocyanate a retardant amount of an organic sulfonyl isocyanate.

Organic sulfonyl isocyanates are known in the art or can be produced by methods known in the art, e.g., U.S. Patents 2,666,787 and 2,974,164; Ber. Deut. Chem. 36, 3213–8 (1903); Ber. Deut. Chem. 37, 690–6 (1904); Ber. Deut. Chem. 38, 2013–5 (1905); Chem. Ber. 90, 2530 (1957); J. Org. Chem. 25, 352–6 (1960).

Organic sulfonyl isocyanates can also be produced by the novel process which comprises mixing phosgene with a sulfonylurea of the formula, $R(SO_2NHCONHR')_n$, wherein R and R' are organic moieties, wherein $n$ is an interger, preferably from 1 to 2, inclusive, wherein each $-SO_2NHCONHR'$ moiety is attached to a different carbon atom of R, and wherein a carbon atom of R' is its point of attachment to the remainder of the sulfonylurea molecule. The products of said novel process are a sulfonyl isocyanate of formula $R(SO_2NCO)_n$ and an isocyanate of the formula R'NCO, wherein R, R', and $n$ are as given above. Sulfonylureas of the formula $$R(SO_2NHCONHR')_n$$

are known in the art or can be prepared by methods known in the art, e.g., by interaction of sulfonamides of the formula $R(SO_2NH_2)_n$ and isocyanates of the formula R'NCO, wherein R, R', and $n$ are as given above.

R and R' in the above novel process can be any organic moieties. It is preferred, however, that R' be lower alkyl. Then the isocyanate product of formula R'NCO will usually be a liquid of relatively low boiling point and hence easily recoverable from the reaction mixture for use in producing additional sulfonylurea reactant by mixing with sulfonamide as above mentioned.

Both mono- and poly-sulfonyl isocyanates can be produced by the novel method herein described. At least one molecular equivalent of phosgene should be reacted with each molecular equivalent of the sulfonylurea reactant. It is preferred to use a slight to moderate excess of phosgene, i.e., about 1% to about 25% by weight beyond the theoretical amount, to ensure that each sulfonylurea moiety is contacted by a full molecular equivalent of phosgene. When another phosgene-reactive moiety, e.g., amino, carboxy, or hydroxyl, is attached to the sulfonylurea reactant, an appropriately larger molecular porportion of phosgene should be used.

The novel reaction is carried out by mixing the sulfonylurea reactant with the necessary amount of phosgene in the range about 0° to about 175° C. It is often advantageous to mix equivalent amounts of phosgene and sulfonylurea in the range about 0 to about 35° C., and then to heat the resulting mixture in the range about 100° to about 175° C. while adding small additional amounts of phosgene to replace that which escapes from the reaction vessel. A useful alternative procedure involves gradual mixing of phosgene and sulfonylurea in the range about 75° to about 100° C., followed by a relatively short heating period in the range about 125° to about 175° C. It is also advantageous to use a liquid diluent which does not itself react appreciably with phosgene. Siutable diluents are the normally liquid aromatic hydrocarbons and halogenated hydrocarbons, e.g., benzene, toluene, the xylenes, ethylbenzene, cymene, cumene, mesitylene, chlorobenzene, dichlorobenzene, and the like.

The amount of diluent is not critical, sufficient being used to give a solution or mobile slurry at the reaction temperature. It is usually advantageous to choose a diluent which will boil at the maximum desired reaction temperature.

The time required for this novel reaction will depend upon such factors as the nature of the sulfonylurea reactant, the nature and amount of diluent, and the reaction temperature. With a reaction temperature in the range about 75° to about 140° C., a reaction time about 30 to about 300 minutes is usually sufficient.

The desired sulfonyl isocyanate can usually be isolated by purging any excess phosgene from the reaction mixture with a stream of an inert gas, e.g., nitrogen or argon, followed by fractional distillation to separate diluent, isocyanate, and sulfonyl isocyanate. The latter can then be purified by conventional techniques, e.g., fractional distillation or recrystallization. If desired, the isocyanate byproduct, i.e., R'NCO, can also be isolated and purified by conventional techniques, and then used to prepare additional sulfonylurea starting material.

Any organic sulfonyl isocyanate can be used to stabilize an organic isocyanate against discoloration and/or against precipitate formation. It is preferred for maximum stabilization against either or both of those phenomena that the organic sulfonyl isocyanate contain at least one aromatic ring. Optimum stabilization is usually obtained when the —$SO_2NCO$ moieties of the organic sulfonyl isocyanate are attached directly to aromatic rings. Examples of suitable sulfonyl isocyanates are: methylsulfonyl isocyanate, butylsulfonyl isocyanate, cyclohexylsulfonyl isocyanate, phenylsulfonyl isocyanate, p-tolylsulfonyl isocyanate, benzylsulfonyl isocyanate, p-chlorophenylsulfonyl isocyanate, m-nitrophenylsulfonyl isocyanate, m-isocyanatophenylsulfonyl isocyanate, p-isocyanatophenylsulfonyl isocyanate, 3-isocyanato-p-tolylsulfonyl isocyanate, 5-isocyanato-o-tolylsulfonyl isocyanate, 3-isocyanato-4-methoxyphenylsulfonyl isocyanate, 4-isocyanato-3-chlorophenylsulfonyl isocyanate, 4'-isocyanato-4-biphenylylsulfonyl isocyanate, 4'-isocyanato-2,2'-dichloro-4-biphenylylsulfonyl isocyanate, 4'-isocyanato-3,3'-dimethoxy-4-biphenylylsulfonyl isocyanate, α-(p-isocyanatophenyl)-p-tolylsulfonyl isocyanate, α-(4-isocyanato-3-methoxyphenyl)-2-methoxy-p-tolylsulfonyl isocyanate, α$^4$-(4-isocyanato-m-tolyl)-2,4-xylylsulfonyl isocyanate, 5-isocyanato-1-naphthylsulfonyl isocyanate, m-phenylenedisulfonyl diisocyanate, p-phenylenedisulfonyl diisocyanate, 4-methyl-m-phenylenedisulfonyl diisocyanate, 2-chloro-p-phenylenedisulfonyl diisocyanate, 5-chloro-m-phenylenedisulfonyl diisocyanate, 1,5-naphthylenedisulfonyl diisocyanate, 3-nitro-p-phenylenedisulfonyl diisocyanate, 4-methoxy-m-phenylenedisulfonyl diisocyanate, 2,5-furandiylbis(methylenesulfonyl) diisocyanate, 4,4'-biphenylenedisulfonyl diisocyanate, 2,2'-dichloro-4,4'-biphenylylenedisulfonyl diisocyanate, 3,3'-dimethoxy-4,4'-biphenylylenedisulfonyl diisocyanate, (methylenedi-p-phenylene)disulfonyl diisocyanate, (methylenedi-3,3'-dimethyl-p-phenylene)disulfonyl diisocyanate, (methylenedi-3,3'-dimethoxy-p-phenylene)disulfonyl diisocyanate, and oxybis-(ethylenesulfonyl) diisocyanate.

The amount of organic sulfonyl isocyanate required to stabilize a particular organic isocyanate will depend on such factors as the stabilization power of the particular organic sulfonyl isocyanate, the tendency of the organic isocyanate to discolor and/or deposit precipitate, and the storage and use conditions to which the organic isocyanate is to be subjected. For example, if light can be excluded during storage, less of the organic sulfonyl isocyanate will usually be needed. As will be apparent to those skilled in the art, the optimum amount of organic sulfonyl isocyanate for a particular organic isocyanate stabilization problem can readily be determined by small scale experiments which simulate the expected large scale storage conditions. Ordinarily, the necessary amount of organic sulfonyl isocyanate will be in the range about 0.1% to about 5% by weight, based on the organic isocyanate. Other inert substances can, of course, be present in the stabilized organic isocyanate composition. For example, a volatile inert solvent can be present when the organic isocyanate is to be used as an adhesive.

When the organic isocyanate is intended for polyurethane production, it is preferred to stabilize with the minimum amount of an organic monosulfonyl monoisocyanate, for example, p-toluenesulfonyl isocyanate. The sulfonyl isocyanate will usually react with a polyol reactant at least as readily as the organic isocyanate itself. In some instances, undesired polyurethane chain termination thereby results. For such applications, it is usually preferred to use an organic disulfonyl diisocyanate or a higher polysulfonyl polyisocyanate because then the stabilizer will eventually become part of the polyurethane chain, and, unlike other known polyisocyanate stabilizers, will not be present as such in the polymer to interfere with further transformation and use of the latter. Another type of organic sulfonyl isocyanate useful for the same type of application is that which contains at least one isocyanato moiety in addition to that which is part of the sulfonyl isocyanate moiety, e.g., p-isocyanatophenylsulfonyl isocyanate. Such polyfunctional stabilizers will also stabilize an organic isocyanate until use and then become part of a polyurethane chain.

Any type or organic isocyanate including monoisocyanates, diisocyanates, and higher polyisocyanates can be stabilized according to this invention. The following are illustrative of the various types of isocyanates which can thus be stabilized: methyl isocyanate, ethyl isocyanate, butyl isocyanate, hexyl isocyanate, dodecyl isocyanate, octadecyl isocyanate, cyclohexyl isocyanate, methylcyclohexyl isocyanate, phenyl isocyanate, p-tolyl isocyanate, 1-naphthyl isocyanate, p-nitrophenyl isocyanate, o-methoxyphenyl isocyanate, p-chlorophenyl isocyanate, ethylene diisocyanate, tetramethylene diisocyanate, hexamethylene diisocyanate, 1,4-cyclohexylene diisocyanate, p-phenylene diisocyanate, 4-methyl-m-phenylene diisocyanate, 2-methyl-m-phenylene diisocyanate, 3,3'-bitolylene-4,4'-diisocyanate, 3,3'-dimethoxymethylenedi-p-phenylene diisocyanate, 1,5-naphthylene diisocyanate, methylenedi-p-phenylene diisocyanate, 2,4'-methylenediphenylene diisocyanate, triphenylmethane triisocyanate, benzyl isocyanate, p-chlorobenzyl isocyanate, and the like, as well as mixtures of two or more of the above-mentioned isocyanates. These organic isocyanates have at least one carbon-attached isocyanato moiety and no sulfonyl isocyanato moieties.

Organic isocyanates stabilized against discoloration, against precipitate formation, or against both, are produced by mixing the appropriate amount of organic sulfonyl isocyanate with the organic isocyanate. Organic sulfonyl isocyanates are usually sufficiently soluble in organic isocyanates so that solutions of the two can readily be prepared. If the amount of organic sulfonyl isocyanate to be used exceeds its solubility in the organic isocyanate, the sulfonyl isocyanate can be present in part as a separate phase. If the organic isocyanate is normally a solid, it can be melted, the organic sulfonyl isocyanate then being dissolved or dispersed in the molten material. The resulting solution or dispersion can then be stored in the liquid state at an elevated temperature or it can be allowed to solidify, preferably with agitation to ensure even distribution of the stabilizer throughout the solidified material. Alternatively, if the organic isocyanate is normally a solid, the organic sulfonyl isocyanate can be mixed therewith by any conventional means, e.g., ball mill, hammer mill, micronizing machine, or the like.

It is known that various basic substances, including alkali metal alkoxides and amines, accelerate the dimerization and trimerization of organic isocyanates [e.g., U.S. Patent 2,978,449; Chem. Rev. 43, 203–18 (1948); Dyestuffs, 42, 263–8 (1958)]. Although it is not known whether such dimers and trimers are structurally similar to the precipitates which are deposited by isocyanates during storage, it was discovered completely unexpectedly that organic sulfonyl isocyanates also retard that polymerizing action of those basic substances.

The invention can be more fully understood from the following examples.

*Example 1*

Varying amounts of p-tolylsufonyl isocyanate were added to freshly-distilled, pure, water-white methylenedi-p-phenylene diisocyanate in the molten state just above its melting point. The resulting solutions were placed and sealed in separate, clear glass containers and were allowed to cool with solidification to about 25° C. These containers were then kept at about 25° C. exposed to laboratory daylight. The sample of methylenedi-p-phenylene diisocyanate which contained no p-tolylsulfonyl isocyanate started to discolor after about 20 hours. A sample containing 0.2% by weight of p-tolylsulfonyl isocyanate did not start to discolor until after about 100 hours. A sample containing 0.5% by weight of p-tolylsulfonyl chloride did not start to discolor until after about 170 hours. A sample containing 1% by weight of p-tolylsulfonyl isocyanate remained water-white for more than 3 weeks. None of the above-described samples of methylenedi-p-phenylene diisocyanate deposited precipitate within the stated times. That fact was shown by dissolving each sample in benzene and filtering the resulting solution.

*Example 2*

Varying amounts of p-tolylsulfonyl isocyanate were added to freshly-distilled, pure, water-white methylenedi-p-phenylene diisocyanate in the liquid state at about 58° C. The resulting solutions were kept in separate, sealed, glass containers in the liquid state at about 58° C. with exclusion of light. The sample of methylenedi-p-phenylene diisocyanate which contained no p-tolylsulfonyl isocyanate started to discolor after about 20 hours. A sample containing 0.2% by weight of p-tolylsulfonyl isocyanate did not start to discolor until after about 4 weeks. A sample containing 1% by weight of p-tolylsulfonyl isocyanate had not started to discolor at the end of 55 days at which time observations ceased. No precipitate formation was observed in any of these samples.

*Example 3*

Two 2-gram samples of freshly-distilled, water-white methylenedi-p-phenylene diisocyanate of the usual commercial grade were kept in separate, sealed, glass containers in the liquid state at about 50° C. with exclusion of light. One of the samples contained 1% by weight of p-tolylsulfonyl isocyanate. At the end of the 7 days, both samples were diluted with 15 ml. of benzene and filtered. The benzene solution of the sample which contained p-tolylsulfonyl isocyanate was clear and water-white, both before and after filtration. The benzene solution of the sample which contained no p-tolylsulfonyl isocyanate was pale yellow in color and when filtered, gave a pale yellow filtrate and about 9 milligrams of solid.

*Example 4*

Following the procedure of Example 3, the stability of a sample of methylenedi-p-phenylene diisocyanate was compared with the stability of a sample containing 1% by weight of p-isocyanatophenylsulfonyl isocyanate. The latter showed no color after 4 weeks at 50° C.

*Example 5*

Following the procedure of Example 3, the stability of a sample of methylenedi-p-phenylene diisocyanate was compared with the stability of a sample containing 1% by weight of 4-methyl-m-phenylenedisulfonyl diisocyanate. The latter showed no color after 4 weeks at 50° C.

*Example 6*

Two 2-gram samples of freshly-distilled water-white methylenedi-p-phenylene diisocyanate of the usual commercial grade were heated just above the melting point to form clear melts. One percent by weight of p-tolylsulfonyl isocyanate was then added to one of the melts. Cooling to 25° C. caused both samples to resolidify. The samples were kept in the solid state in separate, sealed, glass containers at about 25° C. with the exclusion of light. After 2 days, the stabilized sample was still water-white, while the unstabilized sample had a yellow color. After about 7 days, each sample was dissolved in 15 ml. of benzene, and the solutions were filtered. No precipitate was visible or filterable in the solution of the stabilized sample. A significant amount of precipitate was obtained by filtering the solution of the unstabilized sample.

*Example 7*

Following the procedure of Example 6, the stability of a sample of methylenedi-p-phenylene diisocyanate was compared with the stability of a sample containing 1% by weight of p-isocyanatophenylsulfonyl isocyanate. After 5 days, the stabilized sample was still water-white, while the unstabilized sample had a yellow color. After 7 days, each sample was dissolved in 15 ml. of benzene, and the solutions were filtered. No precipitate was visible or filterable in the solution of the stabilized sample. A significant amount of precipitate was obtained by filtering the solution of the unstabilized sample.

*Example 8*

Two samples of freshly-distilled phenyl isocyanate (11.9 g.; 0.1 mole) were placed in separte glass containers. p-Tolylsulfonyl isocyanate (0.197 g.; 0.001 mole) was dissolved in one of the samples. Potassium tert-butoxide (0.056 g.; 0.0005 mole) was then mixed with each sample. In the phenyl isocyanate sample which contained no p-tolylsulfonyl isocyanate, precipate started to form at once and the total sample solidified within about 10 seconds. The phenyl isocyanate sample which contained p-toluenesulfonyl isocyanate remained clear after addition of the potassium tert-butoxide. The latter sample was stored with exclusion of air, moisture, and light at about 25° C. Only a trace of solid had deposited by the end of 50 days.

Example 7 was repeated substituting pyridine (0.0395 g.; 0.0005 mole) for the potassium tert-butoxide. After about two days, the phenyl isocyanate sample which contained no p-tolylsulfonyl isocyanate showed infrared absorption at 5.63$\mu$, a characteristic of isocyanate dimers. After several days, a precipitate also had formed in that phenyl isocyanate sample. The amount of precipitate gradually increased with further time. The sample which contained p-tolylsulfonyl isocyanate showed no absorption at 5.63$\mu$ or precipitate deposition during the several day period.

Example 7 was again repeated substituting 1,4-diazabicyclo[2.2.2]octane (0.056 g.; 0.0005 mole) for the potassium tert-butoxide. After about two days, the phenyl isocyanate sample which contained no p-tolylsulfonyl isocyanate showed infrared absorption at 5.63$\mu$. After several days, a precipitate had also formed in that phenyl isocyanate sample. At the end of 50 days, a total of 10.2 g. dimeric phenyl isocyanate had formed. During about 20 more days, all of the remaining liquid solidified. During the 50-day period, the phenyl isocyanate sample which contained p-tolylsulfonyl isocyanate showed no significant absorption at 5.63$\mu$ and deposited only a trace of a solid which appeared to be a complex of 1,4-diazabicyclo-[2.2.2]octane and p-tolylsulfonyl isocyanate.

*Example 9* p-Tolylsulfonyl isocyanate.—Phosgene (20.9 g.; 0.21 mole) was added gradually during 30 minutes to a stirred solutions of 1-butyl-3-(p-tolylsulfonyl)urea (54 g.; 0.2 mole) in 500 ml. of chlorobenzene with cooling to maintain the resulting mixture at about 25° C. The mixture was then heated with continued stirring at the boiling point under reflux for 30 minutes. A slow stream of phosgene was passed below the surface of the reaction mixture during that reflux period. Excess phosgene was then removed by purging with nitrogen. Butyl isocyanate and solvent were separated from the resulting clear solution by distillation. The residual solution was then distilled at reduced pressure to give 35 g. of p-tolylsulfonyl isocyante; B.P. 100–106° at 1.8 mm.

Example 10

*p-Tolylsulfonyl isocyanate.*—Phosgene (150 g.; 1.5 moles) was added to a stirred solution of 1-butyl-3-(p-tolylsulfonyl)urea (270 g.; 1.0 mole) in 1350 ml. of chlorobenzene in the range of 80° to 100° C. over a period of 150 minutes. The addition was accompanied by a vigorous evolution of hydrogen chloride. The resulting mixture was then heated to the boiling point and excess phosgene was removed by purging with nitrogen for 30 minutes. Distillation of the chlorobenzene and n-butyl isocyanate, followed by vacuum distillation of the residue gave 168.5 g. of p-tolylsulfonyl isocyanate; B.P. 119–120° at 4 mm.

Example 11

*4-methyl-m-phenylenedisulfonyl diisocyanate.*—A solution of phosgene (4.1 g.; 0.041 mole) in 30 ml. of chlorobenzene was added gradually during 8 minutes to a stirred solution of 1,1'-[(4-methyl-m-phenylene)disulfonyl]bis[3-butylurea] (9.0 g.; 0.02 mole) in 60 ml. of chlorobenzene with cooling to maintain the mixture in the range about 8° to 10° C. The resulting mixture was boiled under reflux with stirring for 20 minutes. A slow stream of phosgene was passed below the surface of the reaction mixture during that reflux period. Excess phosgene was then removed by purging with nitrogen. Chrolobenzene and butyl isocyanate were removed by distillation, and the resulting residue was distilled at reduced pressure to give 2.3 g. of 4-methyl-m-phenylenedisulfonyl diisocyanate; B.P. 171–175° C. at 1.8 mm.

Example 12

*p-Chlorophenylsulfonyl isocyanate.*—Phosgene (4.0 g.; 0.04 mole) was added gradually during 10 minutes to a stirred solution of 1 - propyl - 3 - (p - chlorophenylsulfonyl)urea (9.5 g.; 0.035 mole) in 95 ml. of chlorobenzene with cooling to maintain the resulting mixture at about 25° C. The mixture was then heated with continued stirring at the boiling point under reflux for 30 minutes. A slow stream of phosgene was passed below the surface of the reaction mixture during that reflux period. Excess phosgene was then removed by purging with nitrogen. Propyl isocyanate and chlorobenzene were removed by distillation at reduced pressure, and the resulting residue was distilled to give 4.4 g. of p-chlorophenylsulfonyl isocyanate; B.P. 94–95° C. at 0.8 mm.

Example 13

*p - Isocyanatophenylsulfonyl isocyanate.*—1 - butyl - 3-sulfanilylurea (27.1 g.; 0.1 mole) was added gradually during 6 minutes to a stirred solution of phosgene (19.8 g.; 0.2 mole) in 270 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 90 minutes. Excess phosgene was then removed by purging with nitrogen, and the reaction mixture was filtered. Chlorobenzene and butyl isocyanate were removed from the filtrate by distillation, and the resulting residue was distilled at reduced pressure to give 14.4 g. of p-isocyanatophenylsulfonyl isocyanate; B.P. 115–120° C. at 0.4 mm.; M.P. 40–44° C.

Example 14

*m - Isocyanatophenylsulfonyl isocyanate.*—1 - butyl-3-metanilylurea (40 g.; 0.15 mole) was added gradually during 7 minutes to a stirred solution of phosgene (30 g.; 0.3 mole) in 400 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 60 minutes. Excess phosgene was then removed by purging the hot mixture with nitrogen, and the reaction mixture was filtered. Chlorobenzene and butyl isocyanate were removed from the filtrate by distillation, and the resulting residue was distilled at reduced pressure to give 15.3 g. of m-isocyanatophenylsulfonyl isocyanate; B.P. 135–136° C. at 1.1 mm.

I claim:

1. An organic isocyanate having at least one carbon-attached isocyanato moiety and no sulfonyl isocyanato moieties, stabilized against discoloration by having incorporated therewith a stabilizing amount of an organic sulfonyl isocyanate.

2. The composition of claim 1 wherein said organic sulfonyl isocyanate is an aromatic compound.

3. An organic isocyanate having at least one carbon-attached isocyanato moiety and no sulfonyl isocyanato moieties, stabilized against precipitate formation by having incorporated therewith a stabilizing amount of an organic sulfonyl isocyanate.

4. The composition of claim 3 wherein said organic sulfonyl isocyanate is an aromatic compound.

5. A composition comprising an organic isocyanate having at least one carbon-attached isocyanato moiety and no sulfonyl isocyanato moieties, having incorporated therewith from 0.1% to 5% by weight, based on the organic isocyanate, of an organic sulfonyl isocyanate.

6. The composition of claim 5 wherein said organic sulfonyl isocyanate is an aromatic compound.

7. A composition comprising methylenedi-p-phenylene diisocyanate having incorporated therewith from 0.1% to 5% by weight, based on the methylenedi-p-phenylene diisocyanate, of an aromatic sulfonyl isocyanate.

8. The composition of claim 7 wherein said aromatic sulfonyl isocyanate is p-tolylsulfonyl isocyanate.

9. The composition of claim 7 wherein said aromatic sulfonyl isocyanate is 4-methyl-m-phenylenedisulfonyl diisocyanate.

10. The composition of claim 7 wherein said aromatic sulfonyl isocyanate is p-isocyanatophenylsulfonyl isocyanate.

11. The method of stabilizing an organic isocyanate having at least one carbon-attached isocyanato moiety and no sulfonyl isocyanato moieties, which comprises incorporating with said organic isocyanate a stabilizing amount of an organic sulfonyl isocyanate.

No references cited.

CHARLES B. PARKER, *Primary Examiner.*

D. TORRENCE, *Assistant Examiner.*